No. 859,197. PATENTED JULY 9, 1907.
J. BYROM.
V-SHAPED DRIVING BELT.
APPLICATION FILED APR. 20, 1906.

Witnesses.
William A. Blanchard
James C. Thomson.

Inventor
John Byrom
By James A. Coubrough
Attorney

UNITED STATES PATENT OFFICE.

JOHN BYROM, OF LIVERPOOL, ENGLAND.

V-SHAPED DRIVING-BELT.

No. 859,197.  Specification of Letters Patent.  Patented July 9, 1907.

Application filed April 20, 1906. Serial No. 312,838.

*To all whom it may concern:*

Be it known that I, JOHN BYROM, a subject of the King of Great Britain and Ireland, residing at 57 Renshaw street, Liverpool, England, have invented a new and useful Improvement in V-Shaped Driving-Belts, of which the following is a specification.

This invention relates to certain improvements in V-shaped driving belts for motor cycles and similar uses, the object of the invention being to increase the resiliency and also the gripping capacity of such belts when they are upon the driving or driven pulley, and more especially when such pulleys are of comparatively small diameter.

I have found in practice that when plugs or pellets— as for example cylindrical plugs—of a resilient material, such as india rubber, are inserted in such belts, and so disposed therein that the axes of the plugs will be radial relatively to the axes of the pulleys upon which such belts are placed, the behavior of such plugs is as follows. When the belt is curved upon the pulley, the condition of the inner or narrower part of the belt is one of compression, this condition being due to the fact that such inner part of the belt is curved upon a smaller radius than is the case with the outer or broader part of the belt. The effect of this compression of the inner part of the belt is to so alter and distort the cross sectional shape of the india rubber plugs that they assume an approximately oval cross section, the major axis of such oval being across the belt, while its minor axis is in the direction of the length of the belt. The result of this distortion of the india rubber plugs is to distend the sides of the belt at the major axes of such oval plugs. Thus it will be seen that while the plugs retain their cylindrical form in those approximately straight portions of the belt which extend from pulley to pulley and up to the point in the circumference of the pulley where the belt enters the groove therein, immediately the belt commences to curve upon the pulley the said distortion of the plugs and distention of the sides of the belt takes place. Such distention of the sides of the belt, taking place when it is already sunken in the groove of the pulley, enormously increases the gripping effort of the belt upon the pulley.

Figure 1:
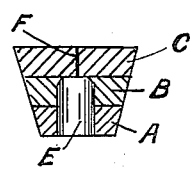
Figure 4:
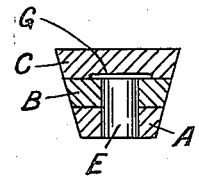
Figure 2:
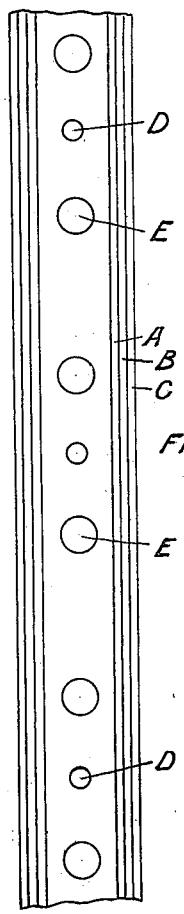
Figure 3:
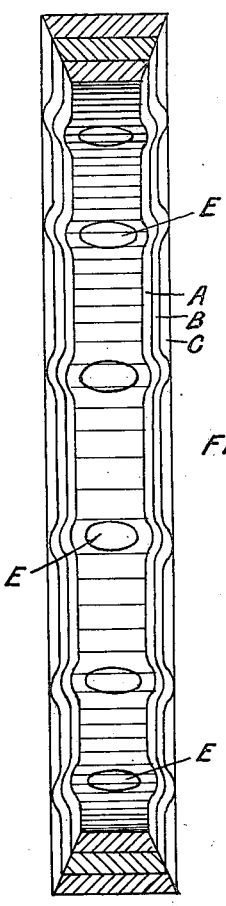
Figure 5:
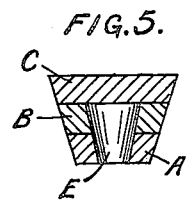
Figure 6:
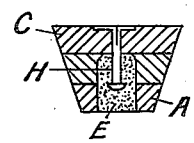

In the annexed drawing Figure 1 is a cross-section of a laminated V-shaped driving belt, and Fig. 2 is an inside face-view of such belt, showing the said rubber plugs in position and in their normal shape. Fig. 3 is an inside face-view of the piece of belt shown in Fig. 2, when the same is curved, showing the distortion of the rubber plugs and the consequent distention of the sides of the belt. Figs. 4, 5 and 6 illustrate modified arrangements of the india rubber plugs.

The belt illustrated comprises three laminations, A, B and C, of leather, secured together by the rivets D or by gluing, stitching or other means. It must however be understood that the number of laminations is immaterial to the invention, and also that canvas or other suitable material may form the said laminations. Apertures are formed in the leather laminations—preferably by boring—to receive the plugs E, the latter being solutioned or cemented therein, and a vent F is provided in the outer lamination C for superfluous solution or cement.

Instead of the india rubber plugs possessing the plain cylindrical form of those illustrated in Figs. 1 and 2, they may possess heads or flanges G, locating between the laminations B and C, as shown in Fig. 4, in which case they need not be cemented in their sockets in the belt. Or the plugs may be coned as illustrated in Fig. 5, the taper of the plugs approximately coinciding with the incline of the sides of the belt. A bifurcated or other rivet may be embedded in each plug E, during vulcanization, as shown in Fig. 6, the ends of the rivet being passed through the outer lamination C and there clenched. Where the belt is composed of canvas, the said plugs may be vulcanized when in position in their sockets, as a means of securing them therein.

Double or multiple rows of the plugs E may be used in belts of considerable width, and the plugs forming such double or multiple rows may be side by side or be staggered, as desired.

Additional india rubber plugs may extend through the belt, either directly or diagonally, from side to side, at right angles to the plugs E, for the purpose of adding resiliency to the belt and increasing its grip, and these additional plugs are preferably disposed in the central lamination of the belt.

Although the plugs E have been specified as possessing a circular cross section—that being the most convenient section—it must be understood that they may be of rectangular, polygonal or other cross section.

Having now described my invention, what I claim as new and desire to secure by Letters Patent, is:—

A V-shaped driving belt possessing resilient plugs E embedded therein, said plugs being so located in the belt that the distortion of said plugs due to their compression by the curvature of the belt effects a distention of the sides of the belt where said plugs are located.

JOHN BYROM.

Witnesses:
JAMES A. CONBROUGH,
WILLIAM A. BLANCHARD.